March 23, 1926.

W. E. ERNST 1,578,112

DEVICE FOR REGULATING TEMPERATURES

Filed August 13, 1923

Inventor:
Wilhelm Eberhard Ernst
By
Attorney

Patented Mar. 23, 1926.

1,578,112

UNITED STATES PATENT OFFICE.

WILHELM EBERHARD ERNST, OF BERLIN-SCHONEBERG, GERMANY.

DEVICE FOR REGULATING TEMPERATURES.

Application filed August 13, 1923. Serial No. 657,022.

*To all whom it may concern:*

Be it known that I, WILHELM EBERHARD ERNST, a citizen of Germany, residing at Berlin-Schoneberg, Germany, have invented certain new and useful Improvements in Devices for Regulating Temperatures, of which the following is a specification.

To regulate the temperature of the circulating cooling fluid of internal combustion engines throttling devices provided with one or two rotary slides and controlled by thermostats have proved particularly suited, provided, one succeeds in so balancing a slide of this kind that even the smallest stroke of the heat-actuated expansion-body is utilized. It has, however, been found that a rotary slide, the sliding face of which extends parallel with the opposite face of its seat-member, or of the counterslide respectively, tends to suck itself fast in the cooling fluid whereby jerky working or even interruption of the service is caused which is dangerous.

This drawback is obviated by shaping the sliding face of the slide or of its seat-member, or of both parts, slightly conically or convex or vaulted, it being, however, necessary to so choose the convexity or the vault in proportion to the diameter of the slide that the ratio is at least 1:5000 if only one of the sliding faces is convex, or that, if both faces are convex, the sum of the vaults corresponds to that ratio.

The conical or convex or vaulted shape of the face or faces concerned, or of the sliding face or faces respectively, may be produced mechanically by suitably machining the respective face or faces, or may be automatically produced while in service, that is under the pressure of the flowing, circulating, cooling fluid, the slide or slides consisting in this case of a pliable material yieldable under the pressure mentioned. This automatic vaulting cannot take place when the material used for the rotary slide or for its seat-member or for both parts is rigid, or if its coefficient of expansion is very low, as is the case, for instance, with china, steatite, pottery material, and the like. If, on the other hand, an elastic material apt to be bulged out by the pressure of the streaming liquid is employed, the valve in question and its seat-member may be flat or plane in the state of rest, which is more fully described hereinafter in connection with the accompanying drawing, in which my invention is illustrated diagrammatically by way of example and in which Figures 1, 2 and 3, are axial sections of three different rotary valves and their seat-members, without the thermostatic controlling means, and Figure 4 is an axial section through a complete regulating device.

Figure 1:
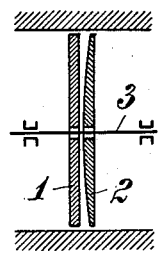
Figure 2:
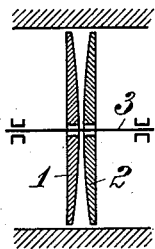

Concerning, first, the rotary slides and their seat-members I mention the fact that a seat forming member need not be stationary, but may also be rotary, that is to say, a rotary valve may serve as a seat for another rotary valve as is the case, for instance, in Figure 1 in which there are two rotary valves 1 and 2 arranged on a common axle 3. The valve disk 1 is plane on both sides, the valve disk 2, however, is slightly conical on that face which is opposite the disk 1. In the modification shown in Fig. 2 also the inner face of the valve disk 1, i. e. that adjacent the disk 2, is slightly conical, and in Figure 3 the rotary valve disk 4 corresponds to the rotary valve disk 1 of Figure 2, but there is provided as seat-member for it in this modification a stationary plate 5 which forms at the same time one of the two bearings for the axle 6 which is an equivalent for the axle 3 of Figures 1 and 2.

While I have shown the valve disk faces, which are not plane, as very low cones, I wish it to be understood that they may be slightly convex instead of conical which, in fact, is the preferred form in certain cases, and always exists if the disks (valve disks or seat-members or both) are made of a flexible or pliable material which can be bulged out under the pressure of the streaming cooling fluid, as already mentioned in the preamble. This refers to the forms of construction shown in Figures 1 and 3, as well as to other imaginable modifications, and as regards modifications having a stationary seat-member, as in Figure 3, also this member may have a conical or convex surface adjacent the conical or convex surface of the rotary valve disk proper. With no conical surface the sliding faces will adhere to each other due to the suction action; and the valves are balanced whereby the resistance they offer the thermostats which tends to rotate them is extremely low.

Figure 3:
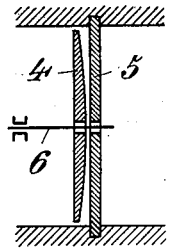
Figure 4:
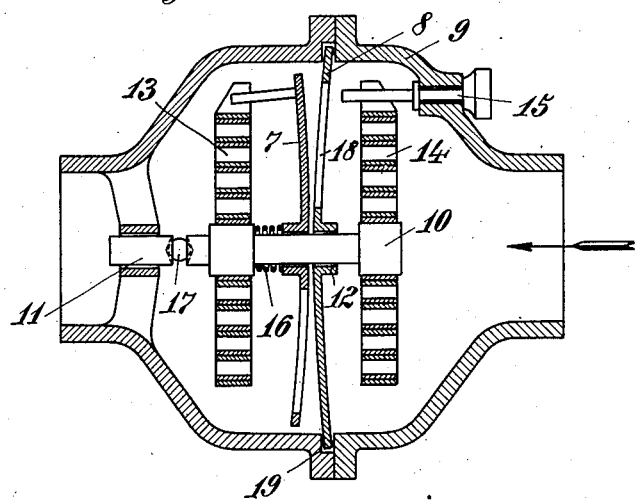

Referring now to Figure 4 which shows a complete regulating device, including its thermostatic regulating members, the valve arrangement proper is practically similar to Figure 3, in that there is a rotary slide disk 7 and a stationary seat plate or disk 8 which latter is secured in place between the halves of the casing 9. The centre part 12 of the seat plate serves as a bearing for a shaft 10, abutting at its rear end against a thrust bearing 11 which takes up the pressure of the circulating cooling fluid which flows through the casing in the direction indicated by the arrow. The shaft 10 is firmly connected with two thermostats 13 and 14, of which the first is connected at its outer end with the rotary valve disk 7, whereas the other is connected at its outer end with a rotary adjusting device or member 15 by which its starting position is determined. The thermostat 14 is located in the inlet half of the casing, the other in the outlet half thereof. Between the centre part or hub of the valve disk 7 and the centre part or hub of the thermostat 13 is a spiral spring 16 encompassing the shaft 10 and pressing it at its rear end against a ball 17 inserted between said shaft and the thrust bearing. This latter may be adjustable so as to alter the pressure of the spring 16, the shaft 10 being then axially shifted in the hub or bearing 12 formed by the centre part of the plate or seat-member 18. Of course, the thermostats are shifted together with the shaft as they are firmly connected therewith, but the means by which the movement of the adjusting means 15 is transmitted to the thermostat 14, and the means by which the movements of the two thermostats and their shaft in general, and of the thermostat 13 in particular, are transmitted to the rotary valve disk 7, are of such a kind that there is no mutual interference between the parts in question.

The pressure which the flowing cooling medium exerts on the thermostats and their shaft is taken up by the ball 17, the bearing surface of which is so very small that the proper operation of the device is not perceptibly impeded even if the velocity of the cooling liquid is particularly great and its pressure is, therefore, correspondingly high. It is obvious that a pointed pressure-receiving member may be used in lieu of the ball 17.

The rotary valve disk 7 and the plate 8, or the stationary seat member respectively, consist, in the example in question, of a pliable material apt to be bulged under the pressure of the streaming fluid. As the seat plate 8 is supported at its rim, and the valve disk proper 7 is supported at its centre, the two parts are bulged in such a manner that their concave faces are opposite to one another, as illustrated in Figure (4) in which the regulating device is supposed to be inserted into the cooling conduit (not shown) of an internal combustion machine. The extent of the bulging or vaulting depends on various circumstances, such, for instance, as the diameter of the valve disk and its seat member, the radial breadth of the annular seat surface 19 at the rim of the seat member, the material used, the thickness thereof, the kind of cooling fluid, the velocity thereof, and so on. The extent of the bulging or vaulting can obviously be altered by altering one or the other or several of the circumstances concerned.

The seat member 8 is provided with radial slots 18 through which the cooling fluid flows when passing from the one half into the other half of the casing. Similar slots are provided in the rotary valve disk 7.

The bulging of the seat member 8 causes a corresponding compression of the spiral spring 16, the tension of the latter thus accommodating itself to the variations occuring, in the velocity and also in the pressure of the circulating cooling fluid. On the other hand, the radius of friction between the valve and its seat becomes smaller the greater the extent of the vaulting or bulging, and the increase of pressure at the ball 17 is, therefore, practically compensated by the decrease of friction, and reversely. The turning moment which the thermostats exert on the valve disk will thus be practically constant so that the regulating device is very sensitive and responds quickly even to very slight movements of the thermostats.

As the quantity of the cooling liquid passing through the regulating device depends obviously on the extent of bulging or vaulting of the valve disk and its seat member which are mutually closing their slots more or less, only a small amount of the cooling fluid circulates at the commencement of the service, and this amount is consequently soon heated to its normal service temperature, as desired for the proper working of the engine. On the other hand, if the load on the engine and the pressure exerted by the cooling fluid pump should have increased, the valve disk and its seat member will be bulged or vaulted to a greater extent, and a larger amount of cooling fluid can pass through the regulating device so as to carry away correspondingly more heat, as desired at this state.

It is not indispensably requisite that both valve members, i. e. the rotary valve disk proper and its seat member, consist of a pliable material which is apt to bulge under the pressure of the circulating fluid. There may be modifications, in which only one or the other of these parts yield in the manner in question, or one may yield at a comparatively low pressure and the other only at a comparatively high pressure, as desired or preferred in the given case.

In order to provide for the requisite tightness, and to ensure it, especially in such cases where the amount of the circulating cooling fluid is only small and the apparatus is very finely regulated, it is necessary to use valve disks and seat members, the operating faces of which are very accurately made, either flat, or slightly conical or convex, provided, of course, a rigid material be used for them. The metals generally used for thermostatic regulating devices, such as brass, bronze, and certain alloys thereof, which are preferably employed because of their suitable behaviour in water, are, in fact, not actually suited from other reasons, viz, regarding their strength and their bending or vaulting capacity; besides, they do not allow of such a manner of working or machining as is requisite to obtain the precision necessary in view of the purpose for which the parts in question are intended. The constant variations of the temperature of the circulating fluid causes variations of the shape of the parts in question, chiefly by changes of the structure of the material, and on the other hand tensions produced by the working or machining of said parts and released by and by may then be detrimental to the proper operation of the apparatus, preventing, perhaps, entirely, the effect on behalf of which they have been installed. Besides, driving pins and axle sleeves or similar members cannot be accurately fitted without being secured in place by soldering because of the exansion of the respective metals or alloys when becoming hot, and, on the other hand, these metals or alloys do not allow of being subjected to a temperature of such a high degree that the part tensions are done away with.

A particular difficulty resides in the feature that the rotary slides undergo easily changes of form while being worked in the chucks, these changes affecting them in such a degree that uniformity, or uniform precision respectively, when a large number thereof is manufactured at a time, cannot be attained. All these drawbacks are overcome by the use of any high-quality, practically non-rusting and non-corrosive steel. Drivers and hubs may then be welded on, preferably by electric resistance welding, whereafter the work pieces can be freed from the working tensions at a temperature of any desired height. The parts may then be further worked on a magnetic chuck whereby their fastening on the base on which the further treatment proceeds is rendered independent of the cleverness of the workmen; and the sliding faces of the valve disks and their seat members may be ground to any precision even if a large number of the parts in question is worked at a time. The faces may even be highly polished, and they may be hardened either before the grinding and the polishing or thereafter, the adhering of particles separated from the cooling fluid being thereby very effectively prevented. I have found that the non-rusting and non-corrosive steels are most suited for the parts stated. Even in the case of wholesale manufacture an excellent quality of the products, as well as full reliability as to dependable function and long service, is warranted in a degree not even approximately attainable with the other materials as usually employed.

In order to prevent the arising of electrolytic actions within the regulating device it is desirable to make it wholly of the high-quality steel mentioned.

I claim:

1. A thermostatic device comprising a casing; a stationary, pliable seat plate arranged in said casing; a shaft in said plate; a rotary pliable disk mounted on said shaft; and a plurality of thermostatic elements for shifting said disk upon variations in temperature.

2. A thermostatic device comprising a casing; and a pair of thermostatically controlled disks mounted in said casing, the adjacent faces of said disks being so shaped that the gap between them increases toward the periphery.

3. A thermostatic device for regulating the flow of the circulating cooling fluid of an internal combustion engine comprising a casing; a pair of disks mounted in said casing and having openings therein, said disks having their adjacent faces so shaped that the gap between them increases from the center to the periphery of the disks; and thermostatic means for actuating one of said disks upon variations in temperature of the cooling fluid.

4. A thermostatic device for regulating the flow of the circulating cooling fluid of an internal combustion engine comprising a casing; a pair of disks mounted in said casing and having openings therein, said disks having their adjacent faces so shaped that the gap between them increases from the center to the periphery of the disks; and thermostatic means for actuating said disks upon variations in temperature of the cooling fluid.

5. A thermostatic device for regulating the flow of the circulating cooling fluid of an internal combustion engine comprising a casing; a pliable seat plate arranged in said casing; a rotary pliable disk in said casing; and thermostatic means for actuating said disk upon variations in temperature of the cooling fluid.

6. A thermostatic device for regulating the flow of the circulating cooling fluid of an internal combustion engine comprising a casing; a pliable seat plate arranged in said casing; a rotary pliable disk in said casing, said plate and disk having openings therein for the passage of the cooling fluid; and thermostatic means for actuating said disk upon variations in temperature of the cooling fluid, said disk and plate being adapted to be vaulted under the pressure of said fluid so that the adjacent faces of said disk and plate move away from each other a distance increasing from the center to the periphery of the disks.

7. A thermostatic device for regulating the flow of the circulating cooling fluid of an internal combustion engine comprising a casing; a pliable seat plate arranged in said casing; a shaft in said plate; a rotary pliable disk mounted on said shaft, said plate and disk having openings therein for the passage of the cooling fluid; and themostatic means for actuating said disk upon variations in temperature of the cooling fluid, said disk and plate being adapted to be vaulted under the pressure of said fluid so that the adjacent faces of said disk and plate move away from each other a distance increasing from the center to the periphery of the disks.

8. A thermostatic device for regulating the flow of the circulating cooling fluid of an internal combustion engine comprising a casing; a pliable seat plate seated in said casing; a shaft arranged in said plate; a rotary pliable disk mounted on said shaft and adapted to rotate thereon, said plate and disk having openings therein for the passage of the cooling fluid; and thermostatic means mounted on said shaft for actuating said disk upon variations in temperature of the cooling fluid, said disk and plate being adapted to be vaulted under pressure of said fluid so that the adjacent faces of said disk and plate move away from each other a distance increasing from the center to the periphery of the disks.

9. A thermostatic device for regulating the flow of the circulating cooling fluid of an internal combustion engine comprising a casing; a pliable seat plate arranged in said casing; a shaft in said plate; a rotary pliable disk mounted on said shaft and adapted to rotate thereon, said plate and disk having openings therein for the passage of the cooling fluid; a spring on said shaft for forcing said disk against said plate; and thermostatic means mounted on said shaft for actuating said disk upon variations in temperature of the cooling fluid, said disk and plate being adapted to be vaulted under pressure of said fluid so that the adjacent faces of said disk and plate move away from each other a distance increasing from the center to the periphery of the disks.

10. A thermostatic device for regulating the flow of the circulating cooling fluid of an internal combustion engine comprising a casing; a pliable seat plate arranged in said casing; a shaft in said plate; a rotary pliable disk mounted on said shaft and adapted to rotate thereon, said plate and disk having openings therein for the passage of the cooling fluid; a spring on said shaft for forcing said disk against said plate; thermostatic means mounted on said shaft for actuating said disk upon variations in temperature of the cooling fluid, said disk and plate being adapted to be vaulted under pressure of said fluid so that the adjacent faces of said disk and plate move away from each other a distance increasing from the center to the periphery of the disks; and a thrust bearing in said casing adapted to take up the pressure exerted by the cooling fluid on the disk and plate and the thermostatic means.

11. A thermostatic device for regulating the flow of the circulating cooling fluid of an internal combustion engine comprising a casing; a pliable seat plate arranged in said casing; a shaft in said plate; a rotary pliable disk mounted on said shaft and adapted to rotate thereon, said plate and disk having openings therein for the passage of the cooling fluid; a spring on said shaft for forcing said disk against said plate; thermostatic means mounted on said shaft for actuating said disk upon variations in temperature of the cooling fluid, said disk and plate being adapted to be vaulted under pressure of said fluid so that the adjacent faces of said disk and plate move away from each other a distance increasing from the center to the periphery of the disks; a thrust bearing in said casing adapted to take up the pressure exerted by the cooling fluid on the disk and plate and the thermostatic means; and an adjusting device mounted in said casing for said thermostatic means for adjusting the position of said openings relative to each other.

12. A thermostatic device for regulating the flow of a fluid comprising a pair of thermostatically controlled valve disks of a pliable material adapted to be vaulted under the pressure of the flowing fluid so that the adjacent faces of said disks move away from each other a distance increasing from the center to the periphery thereof.

13. A thermostatic device for regulating the flow of a fluid comprising a casing; a pair of valve disks mounted in said casing and comprising a pliable material adapted to be vaulted under the pressure of the flowing fluid so that the adjacent faces of said disks move away from each other a distance increasing from the center to the periphery thereof; and thermostatic means mounted in said casing for controlling said disks upon variations of the temperature of the fluid.

14. A thermostatic device for regulating the flow of a fluid comprising a casing; a pair of valve disks mounted in said casing and comprising a pliable material adapted to be vaulted under the pressure of the flowing fluid; and thermostats in said casing for controlling said disks upon variations of the temperature of the fluid.

In testimony whereof I affix my signature.

WILHELM EBERHARD ERNST.